United States Patent Office 3,422,200
Patented Jan. 14, 1969

---

3,422,200
CONTROL OF COCCIDIOSIS IN POULTRY
Edward F. Rogers, Middletown, and Robert L. Clark, Woodbridge, N.J., assignors to Merck & Co., Inc., Rahway, N.J., a corporation of New Jersey
No Drawing. Filed Oct. 30, 1964, Ser. No. 407,887
U.S. Cl. 424—310                     1 Claim
Int. Cl. A61k 25/00

---

ABSTRACT OF THE DISCLOSURE

Anticoccidial compositions comprising as the essential active ingredient a 2-chloro-, nitro-, or loweralkyl-4-amino benzoic acid or a loweralkyl ester or an alkali metal or an alkaline earth metal salt thereof are found to be effective in the control of coccidiosis in poultry. Effective anticoccidial response is achieved by incorporating the coccidiostat in the feed or drinking water of the birds.

---

This invention relates to novel compositions useful in the treatment and prevention of the parasitic disease coccidiosis. It is concerned further with a novel method of controlling coccidiosis, and with animal feeds and feed supplements containing as an active anticoccidial agent certain 2-substituted-4-amino benzoic acid compounds.

Coccidiosis is a common and widespread disease caused by species of protozoan parasites of the genus Eimeria. In poultry coccidiosis, the more important of these species are *E. maxima, E. acervulina, E. tenella, E. necatrix, E. brunetti, E. praecox* and *E. mitis*. In turkeys, *E. meleagridis* and *E. adenoides* are also causative organisms of coccidiosis. When left untreated, the severe forms of the disease lead to poor weight gain, reduced feed efficiency and high mortality. For these reasons, the successful control of coccidiosis is of significant importance.

According to the present invention, certain derivatives of benzoic acid have been found to be highly effective in the treatment and prevention of coccidiosis, and especially poultry coccidiosis due to *E. maxima* and other intestinal species such as *E. mitis, E. acervulina* and *E. brunetti*. One object of the invention, therefore, is to provide novel compositions containing such compounds. Another object is provision of animal feeds and feed supplements containing such compounds as active anticoccidial agents. A still further object is provision of a new method of controlling coccidiosis by administration of these substances to poultry susceptible to coccidiosis. Other objects will become evident from the following discussion of the invention. In accord with this invention, it has now been found that 2-substituted-4-amino benzoic acid and derivatives thereof having the structural formula

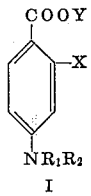

I possess significant anticoccidial activity, and may be effectively used in the methods and compositions of the invention. In the above formula X represents chloro, nitro or lower alkyl such as methyl, ethyl or propyl; Y represents hydrogen, lower alkyl radicals having 1–6 carbon atoms such as methyl, ethyl, isopropyl and butyl, or an alkali or alkaline earth metal such as sodium, potassium and calcium. It will, of course, be understood that when Y is a divalent alkaline earth metal, the salt will contain two of the benzoic acid residues. $R_1$ and $R_2$ represent hydrogen, lower alkyl or acyl; as the acyl radical, lower alkanoyl groups such as acetyl, propionoyl and butyroyl or a benzoyl group are preferred. The basic substituent, i.e. amino or alkylamino in these compounds permits formation of non-toxic acid addition salts such as hydrochloride, sulfate, nitrate, or hydrobromide, and such salts are within the purview of this invention.

The compounds of Formula I above may be prepared by methods described in the literature. Several of such compounds have been previously made for other purposes so that detailed procedures for making them are known. Those which are not specifically described may be obtained from known substances by following the methods described for related compounds. Thus, the free acids are esterified by heating with a lower alkanol in the presence of a mineral acid such as sulfuric acid, and the 4-amino group is acylated by reaction with an acylating agent such as benzoyl chloride, a lower alkanoyl chloride or an aliphatic acid anhydride under basic conditions.

Thus, the benzoic acid compounds which, according to this invention, are found to be effective anticoccidial agents include 2-ethyl-4-amino benzoic acid, 2-propyl-4-amino benzoic acid, 2-chloro-4-amino benzoic acid, methyl-2-chloro-4-amino benzoate, propyl-2-methyl-4-amino benzoate, methyl-2-ethyl-4-acetamido benzoate, sodium-2-nitro-4-benzamide benzoate, 2-ethyl-4-benzamido benzoic acid, methyl-2-ethyl-4-methylamino benzoate, ethyl-2-chloro-4-diethylamino benzoate, and sodium-2-ethyl-4-amino benzoate.

The compounds of Formula I above are employed for the prevention and treatment of poultry coccidiosis by administering them to poultry susceptible to or infected with coccidia. This is normally accomplished by incorporating the coccidiostat in the feed or the drinking water of the birds. In terms of the total feed or liquid intake of the poultry, only minor amounts of coccidiostat are necessary for satisfactory control of the coccidial infection.

The preferred dose levels of 2-substituted-4-amino benzoic acid compound required for prevention of coccidiosis in poultry will vary to some degree depending upon the specific compound employed as well as the type and severity of the coccidial infection. With substances such as 2-ethyl and 2-chloro-4-amino benzoic acids, which represent preferred embodiments of this invention, good results are obtained by administering to the poultry a finished feed containing from about 0.006% to about 0.03% by weight of drug. It is preferred, however, to administer the compounds at levels of from about 0.01% to about 0.025% by weight of the feedstuff. It will be appreciated by those skilled in this art that the lowest levels consonant with fully adequate control of coccidiosis and the development of immunity will be employed in most instances in order to eliminate as far as possible any risk of side effects that might be induced on prolonged feeding of unnecessarily high levels of these coccidiostats. The finished feed in which the coccidiostat is employed is a nutritionally adequate one containing sources of carbohydrate, protein, fat, vitamins, minerals and other nutritional factors commonly employed in commercial poultry raising.

The coccidiostats described herein may also be administered by way of the drinking water of the infected animals. The preferred dose levels in the drinking water are usually somewhat less than those employed in a solid feed inasmuch as poultry drink about twice as much as they eat. Administration of these anticoccidial substances in the drinking water is of advantage when using the compounds therapeutically. It is convenient to prepare dispersible or water-soluble powders in which the coccidiostat is intimately dispersed in a suitable carrier such as dextrose or sucrose at concentrations of from about 0.3% to about 25% by weight. These solids may then be conveniently added to the drinking water by the poultry raisers.

In addition to poultry feeds containing a minor amount of a compound of Formula I above as an effective anticoccidial agent, there are provided in accordance with an additional aspect of this invention poultry feed supplement compositions wherein the 2-substituted-4-amino benzoic acid compounds are intimately dispersed in or admixed with a suitable solid non-toxic diluent or carrier. The carrier vehicle employed in these supplement compositions should be one in which the coccidiostat is stable, which is compatible with a finished poultry feed and which can be administered with safety to the animals. These feed supplements, which contain a significantly higher percentage of coccidiostat than does the finished feed, are mixed with or blended into the feedstuff. In order to assure uniform distribution of the coccidiostat in the finished feed, it is customary to employ an intermediate dilution step in which the supplement is blended with a portion of the final feed, and this "intermediate mix" is then added to the remainder of the feed with adequate mixing. The coccidiostat compounds described hereinabove may be formulated into feed supplement compositions containing from about 1.0% to about 30% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 5–25% by weight of active ingredient are quite suitable.

The diluents normally employed for these poultry feed supplements are solid orally ingestible poultry feed additives such as distiller's dried grains, corn meal, citrus meal, fermentation residues, ground oyster shells, Attapulgus clay, wheat middling, wheat shorts, molasses solubles, corn cob meal, corn gluten feed, corn germ meal, edible vegetable substances, soybean meal, dehulled soya flour, soybean mill feed, antibiotic mycelia, crushed limestone, soya grits and the like. It is preferred, although not essential, that the carrier be a nutritive one.

Examples of typical feed supplements containing a coccidiostat of the present invention are:

A | Lbs.
--- | ---
2-ethyl-4-amino benzoic acid | 5.0
Wheat middlings | 95.0

B | 
--- | ---
Methyl-2-chloro-4-amino benzoate | 20.0
Corn gluten feed | 80.0

C | 
--- | ---
Methyl-2-ethyl-4-acetamido benzoate | 10.0
Corn distiller's dried grains | 90.0

The 2-substituted-4-amino benzoic acid compounds described herein are primarily effective against the intestinal species *E. maxima* and *E. brunetti* and are less effective than many other coccidiostats against *E. tenella* and *E. necatrix*. Examples of such other coccidiostats are amprolium, nicarbazin, glycarbylamide, 3,5-dinitrobenzamide and 2-methyl-3,5-dinitrobenzamide. Thus, one of the purposes of this invention is to provide highly active broad spectrum anticoccidial compositions which comprise a compound of Formula I above and at least one other anticoccidial agent that is effective primarily against *E. tenella* and/or *E. necatrix*. In many cases the efficacy of such a combination is greater than would be expected from the activity of either coccidiostat alone.

The following examples are given for the purpose of illustration and not by way of limitation:

EXAMPLE 1

Anticoccidial activity of the compounds of this invention is determined by administering graded concentrations of drug to straight run White Leghorn chicks previously inoculated with sporulated oocysts of *Eimeria maxima*. The drug is blended in the standard laboratory chick ration just prior to use, and the chicks fed the medicated ration ad libitum. Groups of uninfected and infected, non-medicated chicks are included in the test as normal and positive controls. On the sixth day after infection the birds are weighed, sacrificed and examined for oocysts. The anticoccidial activity of a compound is expressed in terms of the minimum effective dose (in the feed) necessary to reduce significantly the number of oocysts in the birds, as compared with the controls.

In experiments conducted in this way, the following compounds were active when administered at the feed levels shown:

| | Percent by wt. (in feed) |
| --- | --- |
| 2-ethyl-4-amino benzoic acid | 0.006 |
| 2-methyl-4-amino benzoic acid | 0.025 |
| 2-chloro-4-amino benzoic acid | 0.006 |
| 2-nitro-4-amino benzoic acid | 0.0125 |

EXAMPLE 2

A. A mixture of 18 grams of 2-ethyl-4-amino benzoic acid and 8.0 grams of sodium hydroxide in 100 ml. of water is cooled to room temperature, and to this solution there is added slowly with stirring 15 grams of benzoyl chloride in 40 ml. of ether. The mixture is stirred for 30 minutes and an additional 4 grams of sodium hydroxide is added. It is stirred for two more hours. The aqueous layer is then separated and diluted with an equal volume of water. Hydrochloric acid is added with stirring to bring the pH to 2. The resulting solid 2-ethyl-4-benzamido benzoic acid is recovered by filtration and dried.

B. Other acyl amino compounds are prepared in similar fashion using the appropriate acyl chloride or by reaction of the parent amine with a lower aliphatic acid anhydride in benzene.

C. The benzoic acid esters which are included within the coccidiostats of this invention are prepared from the corresponding free acids by heating the solution of the free acid in a lower alkanol (corresponding to the desired ester) in the presence of sulfuric acid. The reaction mixture is heated for about 12 hours and the excess alcohol then removed by distillation. The desired ester is isolated by techniques known to those skilled in this art.

D. The 2-substituted-4-dialkyl amino benzoic acid compounds described above are prepared from the corresponding 4-amino derivatives by the procedure illustrated below:

Nine grams of 2-chloro-4-amino benzoic acid, 4 grams of sodium hydroxide and 15 grams of methyl iodide are added to 100 ml. of methanol and the mixture stirred at room temperature for about three days. An additional 2 grams of sodium hydroxide is then added and the reaction mixture refluxed for 45 minutes. The methanol is then removed by distillation and the residue dissolved in 20 ml. of hot water. The aqueous solution is chilled and the resulting precipitate of sodium 2-chloro-4-dimethyl amino benzoate recovered by filtration. The filtrate is dissolved in water and the solution neutralized with dilute hydrochloric acid to precipitate 2-chloro-4-dimethylamino benzoic acid.

The above examples illustrate the methods for preparing the various compounds which, in accordance with the invention, have been found to be highly active anticoccidial agents. They can, of course, be applied to make other esters and other alkyl amino and acyl amino derivatives in addition to those specifically described.

Any departure from the above description which conforms to the present invention is intended to be included within the scope of the claims.

What is claimed is:
1. The method of controlling coccidiosis in poultry that comprises orally administering to poultry susceptible to coccidiosis an anticoccidial amount of a compound having the formula

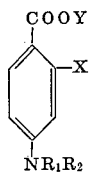

where each of $R_1$ and $R_2$ are selected from the group consisting of hydrogen, lower alkyl, lower alkanoyl and benzoyl; Y is selected from the group consisting of hydrogen, lower alkyl, an alkali metal and an alkaline earth metal; and X is selected from the group consisting of lower alkyl, chloro and nitro.

References Cited
UNITED STATES PATENTS

| | | | |
|---|---|---|---|
| 3,052,602 | 9/1962 | Hymas et al. | 167—53.1 |
| 2,787,574 | 4/1957 | O'Neill et al. | 167—53.1 |
| 3,260,647 | 7/1966 | Harris et al. | 167—53 |
| 3,211,611 | 10/1965 | Clark et al. | 167—53.1 |
| 3,211,610 | 10/1965 | Rogers et al. | 167—53.1 |
| 3,211,612 | 10/1965 | Rogers et al. | 167—53.1 |

OTHER REFERENCES

Chemical Abstracts (I), vol. 52, 1958, p. 17509c.
Chemical Abstracts (II), vol. 45, 1951, p. 7249b.
Chemical Abstracts (III), vol. 45, 1951, pp. 9742i–9743a.
Chemical Abstracts (IV), vol. 47, 1953, p. 8174b.
Chemical Abstracts (V), vol. 40, 1946, p. 2942.
Chemical Abstracts (VI), vol. 51, 1957, p. 10777c.
Chemical Abstracts (VII), vol. 54, 1960, p. 6895e.
McManus et al., Develop. Ind. Microbiol. 6, 44–7, 1965.

FRANK CACCIAPAGLIA, JR., *Primary Examiner.*
S. J. FRIEDMAN, *Assistant Examiner.*